United States Patent [19]

Werner et al.

[11] 4,082,371
[45] Apr. 4, 1978

[54] SUPPORT AND GUIDE FOR A TRACK OF A TRACK-LAYING VEHICLE

[75] Inventors: Gregory Keith Werner, Dubuque; Kenneth Oscar Switzer, Peosta, both of Iowa; Raymond G. St. Laurent, Amos, Canada

[73] Assignee: Deere & Company, Moline, Ill.

[21] Appl. No.: 710,561

[22] Filed: Aug. 2, 1976

[51] Int. Cl.$^2$ ............................................. B62D 55/20
[52] U.S. Cl. ..................................................... 305/56
[58] Field of Search .................... 305/56, 11, 12, 16, 305/17, 24, 21, 35 R, 28

[56] References Cited

U.S. PATENT DOCUMENTS

| | | | |
|---|---|---|---|
| 1,318,188 | 10/1919 | Tritton | 305/12 X |
| 1,568,665 | 1/1926 | Gelly | 305/12 X |
| 1,647,540 | 11/1927 | Rasmussen | 305/12 |
| 2,049,693 | 8/1936 | Eberhard | 305/12 |
| 2,418,610 | 4/1947 | Webb | 305/12 X |
| 2,989,351 | 6/1961 | Deysher et al. | 305/56 X |

*Primary Examiner*—Allen N. Knowles
*Assistant Examiner*—John P. Shannon

[57] ABSTRACT

A frame for supporting a track of a track-laying vehicle includes a pair of lower longitudinally extending members having surfaces disposed to prevent sideways movement of the track and for supporting the track shoes in the event that the track begins to twist from working loads imposed thereon.

4 Claims, 3 Drawing Figures

SUPPORT AND GUIDE FOR A TRACK OF A TRACK-LAYING VEHICLE

BACKGROUND OF THE INVENTION

The present invention relates to frames for supporting tracks of track-laying tractors and more particularly relates to portions of such frames which are adapted to prevent undue damage to the tracks.

When track-laying vehicles such as those commonly used in forestry and excavating are operated, it sometimes happens that the track passes over obstructions such as bumps, logs and rocks or the like resulting in single track shoe loading which is sometimes in the nature of bending loads that cause damage to the track shoes and/or the remainder of the track.

SUMMARY OF THE INVENTION

According to the present invention there is provided a novel frame for supporting a track of a track-laying vehicle and more particularly there is provided structure for minimizing damage to the track and track shoes during single track shoe loading.

A broad object of the invention is to provide track-laying structure for supporting one or more of the track shoes after the track has undergone a predetermined amount of twist.

A further object of the invention is to provide a track-laying support structure which will prevent the track from sliding sideways from rollers of the track assembly.

Another object of the invention is to provide track protecting structures which may be easily connected to and removed from the track support frame.

These and other objects will become apparent from a reading of the ensuing description taken in conjunction with the appended drawings.

DESCRIPTION OF THE PREFERRED EMBODIMENT

Figure 1:
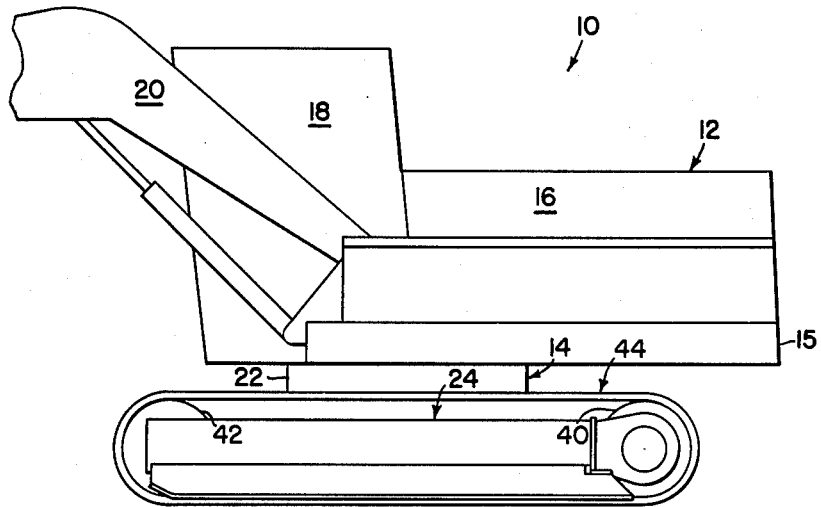
FIG. 1 is a schematic left side elevational view of a typical track-laying vehicle with which the present invention is particularly adapted for use.

Referring now to FIG. 1, therein is shown an industrial vehicle 10 of a type commonly used for excavating or forestry harvesting work and with which the present invention is particularly adapted for use. Specifically, the vehicle 10 includes a superstructure 12 rotatably supported, in a manner conventional in the art, on an undercarriage 14.

The superstructure 12 includes a frame 15 which supports an engine (which is not shown) in an engine compartment 16 located at the rear of the frame. Supported at the forward end of the frame 15 is an operator's cab 18 located along the side of the rear end portion of a boom structure 20 having its rearend connected to the frame 15. The boom structure 20 would normally support excavating or forestry harvesting attachments (not shown) as is conventional.

The undercarriage 14 includes a main frame or carbody 22 including longitudinally extending right and left track support frames 24 of which only the left frame is shown and described herein for the sake of brevity.

Figure 3:
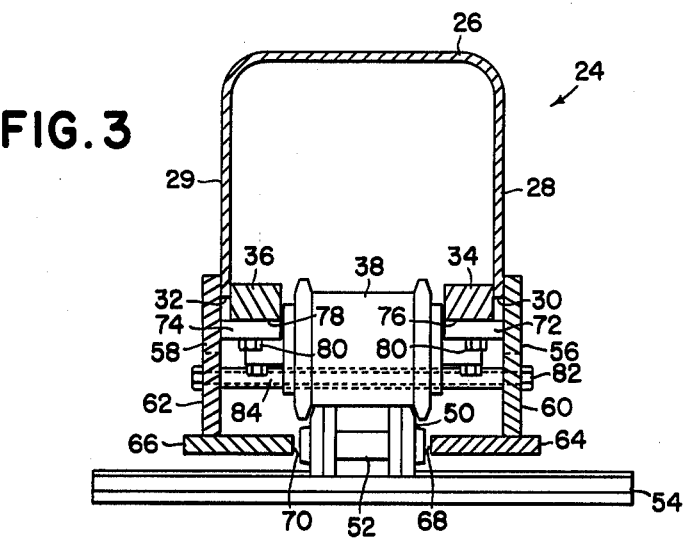
FIG. 3 is an enlarged sectional view taken along the lines 3—3 of FIG. 2 with parts omitted for the sake of simplicity.
Figure 2:
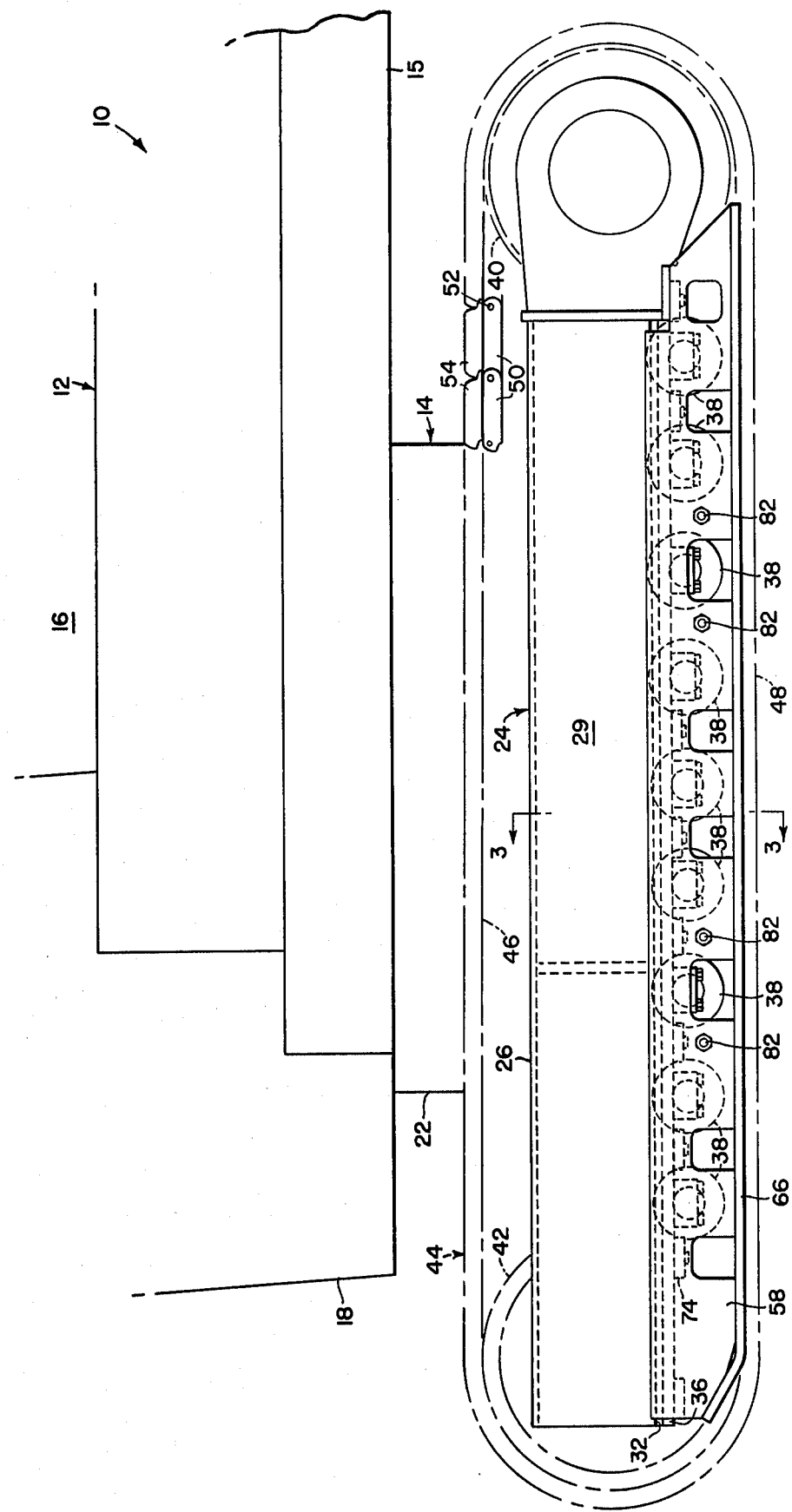
FIG. 2 is an enlarged view of a track support assembly shown in FIG. 1.

As can best be seen in FIGS. 2 and 3, the track support frame 24 includes a longitudinally extending, inverted U-shaped main frame member 26 including right and left transversely spaced vertical walls 28 and 29, respectively, the walls 28 and 29 having lower horizontal edges 30 and 32, respectively. Right and left longitudinal mounting bars 34 and 36, respectively, are fixed, as by welding, to respective inner surfaces of the walls 28 and 29 and extend downwardly below the edges 30 and 32. A plurality of track support roller assemblies 38 are disposed centrally between the vertical walls 28 and 29 and are mounted on the bars 34 and 36 at longitudinally spaced locations. Supported at the rear of the main frame member 26 is a drive sprocket 40 and supported at the forward end of the frame member 26 is an idler wheel 42.

An endless track assembly 44 is entrained about the drive sprocket 40 and idler wheel 42 so as to define upper and lower runs 46 and 48. The track assembly 44 comprises an articulated link assembly including a plurality of links 50 hingedly or pivotally interconnected by pivot pin and bushing assemblies 52 and a plurality of track shoes 54 fixed to the links in a conventional manner, the shoes 54 extending transversely beyond the vertical walls 28 and 29 of the main frame member 26. As is conventional in the art, the pivot pin and bushing assemblies 52 are engaged by the respective teeth (not shown) of the drive sprocket 40 when the track 44 passes thereover. Further, it is to be noted that the pivot pin and bushing assemblies 52 of the lower run 48 of the track 44 engage the track support roller assemblies 38.

It is to be noted that the structure heretofore described is largely conventional and that the instant invention concerns the cooperation of structure to be described below with that which has already been described.

For the purpose of preventing damage to the track 44 when the latter is flexed by passing over a rock, stump, or other obstacles of that nature, right and left track guide and support members 56 and 58, respectively, are mounted on the track support frame 24. Specifically, the members 56 and 58 comprise welded structures respectively including vertical sections 60 and 62 having upper end portions disposed in embracing relationship to outer surface portions of the vertical walls 28 and 29 and having lower ends welded to respective horizontal sections 64 and 66, respectively, the horizontal sections 64 and 66 having respective inner edges 68 and 70 disposed adjacent to the ends of the pivot pin and bushing assemblies 52 of the lower run 48 of the track 44. Respectively welded to the vertical sections 60 and 62 at locations above the horizontal sections 64 and 66 are a plurality of horizontal tabs 72 and 74 which embrace downwardly facing horizontal mounting surfaces of the longitudinal mounting bars 34 and 36 and are secured to the bars 34 and 36 through means of a plurality of screw fasteners 80. For the purpose of rigidifying and maintaining parallelism between the track guide and support members 56 and 58, there is provided a plurality of spacer assemblies, the spacer assemblies each comprising a bolt 82 extending through the vertical sections 60 and 62 of the members 56 and 58 and having a tubular spacer member 84 received thereon and engaged with the inner surfaces of the vertical sections 60 and 62.

It will be appreciated that, during the operation of the vehicle 10, the tendency of track 44 to shift sideways relative to the support frame 24 is resisted by the pivot pin and bushing assembles 52 coming into engagement with the inner edges 68 or 70 of the track guide and support members 56 and 58. Further it will be appreciated that when the tracks of the vehicle 10 pass over an obstacle, such as a rock or log, individual loading of the track shoes 54 will occur and if an end portion of one of the track shoes 54 engages an obstacle being passed over by the vehicle 10, the engaged shoe 54 will rise only as far as permitted by the lower surfaces of the horizontal sections 64 and 66 of the track guide and support members 56 and 58, the forces imposed on the track then being transmitted to the frame 24 so as to prevent undue loading of the track shoe and damage that might occur as a consequence of such loading.

We claim:

1. A track frame and track combination for a track laying vehicle comprising: a main longitudinally extending support member defining a pair of transversely spaced vertical walls having respective lower edges, a pair of longitudinal mounting bars respectively fixed to inner surface portions of the pair of walls in overlapping relationship to the respective lower edges of the walls; track support rollers connected to respective downwardly facing mounting surfaces of the pair of mounting bars at longitudinally spaced and aligned locations between the walls and having portions extending below the edges; a track drive sprocket supported at a first end of the support member; a track idler wheel supported at a second end of the support member; a track extending around the support member and thus defining upper and lower runs and including a plurality of track shoes having a width greater than the transverse dimension of said support member and being hingedly interconnected by pin assemblies including parts positioned so as to mesh with teeth of said sprocket as they travel thereover and to engage the support rollers when the track passes thereunder; track support and alignment means including first and second longitudinally extending track guide and support members including main vertical portions respectively fixed to and embracing outer surface portions of the pair of transversely spaced walls above the lower edges of the latter and extending therebelow and including respective guide and support portions extending generally horizontally above and adjacent to ground-contacting portions of the track shoes and including edge portions respectively terminating adjacent opposite ends of those of said pin assemblies located in the lower run of the track; and transverse mounting tabs fixed to the main vertical portions of the first and second track guide and support members and being releasably secured to the mounting surfaces of the pair of mounting bars.

2. The track frame and track combination defined in claim 1 wherein a plurality of transverse spacers extend between and are secured to the main vertical portions of the track guide and support members at an elevation between the lower portions of the track guide and support members and the tabs thereof.

3. In a track frame and track combination including a main longitudinally extending support member defining first and second generally vertical transversely spaced walls having lower edges respectively overlapped by a pair of longitudinal mounting bars fixed to respective inner portions of the walls and defining first and second downwardly facing mounting surfaces, a plurality of track support rollers respectively extending between and mounted at longitudinally spaced transversely opposite locations of the first and second downwardly facing mounting surfaces, drive and idler members respectively mounted adjacent first and second ends of the support member, an endless track trained about the drive and idler members so as to define upper and lower runs respectively located above and below the support member, and said track including a plurality of track shoes hingedly connected together by track pin assemblies disposed to be in meshing engagement with drive portions of the drive member when passing thereover, the improvement comprising: first and second longitudinal track guide and support members respectively forming lower extensions of the first and second transversely spaced walls and respectively including transversely extending lower portions located adjacent to and extending generally parallel to upper surface portions of the lower run of the track and having respective surfaces disposed adjacent to opposite ends of the track pin assemblies; said first and second track guide and support members each further including a main vertical portion extending above the lower edge of and disposed in embracing relationship to a respective one of the first and second transversely spaced walls; and transverse mounting tabs fixed to each main vertical portion and extending below the mounting surfaces and being releasably secured to a respective one of said longitudinally extending bars.

4. The track frame and track combined defined in claim 3 and including a plurality of transverse spacers extending between the main vertical portions of the first and second track guide and support members at an elevation between that of the lower portions of the track guide and support members and the mounting tabs.

* * * * *